United States Patent [19]
Yen et al.

[11] Patent Number: 6,001,919
[45] Date of Patent: Dec. 14, 1999

[54] CONDUCTIVE SHEET MOLDING COMPOUND

[75] Inventors: Robert C. Yen, Farmington Hills; Terry L. Ingham, Oxford, both of Mich.; James A. Bono, Van Wert, Ohio

[73] Assignee: The Budd Company, Troy, Mich.

[21] Appl. No.: 09/055,675

[22] Filed: Apr. 6, 1998

[51] Int. Cl.$^6$ .............................. C08K 3/04; C08K 5/01; C08L 63/00; H01B 1/04
[52] U.S. Cl. .......................... 524/496; 524/433; 524/425; 523/217; 523/221; 523/351; 252/502
[58] Field of Search .................... 524/496, 433, 524/425; 523/217, 221, 351; 252/502

[56] References Cited

U.S. PATENT DOCUMENTS

| | | | |
|---|---|---|---|
| 3,357,930 | 12/1967 | Marks et al. | 252/500 |
| 3,578,484 | 5/1971 | Walles et al. | 427/477 |
| 3,671,504 | 6/1972 | Marumo et al. | 524/105 |
| 3,963,647 | 6/1976 | Straub | 252/511 |
| 4,592,808 | 6/1986 | Doubt | 205/102 |
| 4,622,354 | 11/1986 | Iseler et al. | 523/527 |
| 4,974,307 | 12/1990 | Uebayashi et al. | 427/299 |
| 5,162,401 | 11/1992 | Ross et al. | 523/511 |
| 5,188,783 | 2/1993 | Pierce | 264/104 |
| 5,194,328 | 3/1993 | Suzuki et al. | 428/328 |
| 5,338,578 | 8/1994 | Leach | 427/470 |
| 5,411,210 | 5/1995 | Gimple et al. | 239/110 |
| 5,427,715 | 6/1995 | Ohwa et al. | 252/500 |
| 5,468,681 | 11/1995 | Pasch | 428/108 |
| 5,484,838 | 1/1996 | Helms et al. | 524/496 |
| 5,501,934 | 3/1996 | Sukata et al. | 430/110 |
| 5,514,423 | 5/1996 | Krish et al. | 427/470 |
| 5,585,038 | 12/1996 | Kirmanen et al. | 252/500 |
| 5,585,040 | 12/1996 | Kiramen et al. | 252/500 |
| 5,611,964 | 3/1997 | Friend et al. | 252/511 |
| 5,629,050 | 5/1997 | Silvis et al. | 252/50 |
| 5,830,541 | 11/1998 | Carswell et al. | 427/475 |
| 5,852,135 | 12/1998 | Kanai et al. | 525/398 |

FOREIGN PATENT DOCUMENTS

| | | |
|---|---|---|
| 751184 | 1/1997 | European Pat. Off. . |
| 19641940 | 4/1998 | Germany . |
| 3057610 | 3/1991 | Japan . |
| WO 97/34709 | 9/1997 | WIPO . |

*Primary Examiner*—James J. Seidleck
*Assistant Examiner*—Olga Asinovsky
*Attorney, Agent, or Firm*—Harness, Dickey & Pierce, P.L.C.

[57] ABSTRACT

The present invention provides an electrically conductive sheet molding compound composition adapted for electrostatic painting comprising a resin mixture including about 20 to about 60% by weight of thermoplastic resin based on the total weight of said resin mixture, the thermoplastic resin being selected from the group consisting of styrene-butadiene rubber, polystyrene, saturated polyester resin, and mixtures thereof; fibrous reinforcing material; and conductive material. The conductive material is added to the sheet molding compound composition in a sufficient quantity to render an article molded with said composition with structural integrity and electrically conductive enough to be electrostatically painted.

21 Claims, No Drawings

CONDUCTIVE SHEET MOLDING COMPOUND

BACKGROUND OF THE INVENTION

1. Field of the Invention

The present invention relates generally to electrically conductive sheet molding compound compositions and methods of forming the compositions and, more particularly, to an electrically conductive sheet molding compound composition including conductive carbon black adapted for electrostatic painting.

2. Discussion of the Related Art

Electrostatic painting of various automobile parts, including doors and hoods, is commonly used today in the automotive industry. Electrostatic painting of sheet molding compound (SMC) substrates, for example, is desirable because it reduces paint waste and emissions as compared to non-electrostatic painting techniques. Electrostatic painting techniques require the substrate to be electrically conducting or to have an applied prepcoat or primer which is electrically conducting in order to display an increased paint transfer efficiency. Currently, an electrically conductive primer must be applied to a sheet molding compound composition article to be coated prior to electrostatically painting the article because, unlike steel, sheet molding composition is not conductive.

When using an electrically conducting primer, the path to ground is achieved via the conducting primer. An alternative technique is to use a grounding clip. This undesirably causes higher film builds near the grounding clip with film builds decreasing as the distance from the grounding clip increases. In addition, after several passes through the paint booth, significant resistance to ground may be encountered due to multiple paint layers on the buck itself.

There thus exists a need in the art to provide a sheet molding compound composition material with increased electrical conductivity. This would overcome problems associated with electrostatically painting articles whose electrical conductivity is provided only through a conductive primer or prep coat. These problems include excessive waste of paint as a result of the need for overspraying, increase in pollution, and the inability to evenly coat the substrate. Although the general idea of conductive sheet molding compound has been previously suggested, problems exist in obtaining uniform conductivity within a molded part, resulting in poor paint adhesion. The present invention overcomes these problems by incorporating conductive carbon black into molding compound compositions, such as sheet molding compound compositions, to increase the electrical conductivity of the compositions for use with electrostatic painting.

SUMMARY OF THE INVENTION

The present invention provides an electrically conductive sheet molding compound composition adapted for electrostatic painting comprising a resin mixture including about 20 to about 60% by weight of thermoplastic resin based on the total weight of said resin mixture, the thermoplastic resin being selected from the group consisting of styrene-butadiene rubber, polystyrene, saturated polyester resin, and mixtures thereof; fibrous reinforcing material; and conductive material. The conductive material is present in a sufficient quantity to render an article molded with the composition with structural integrity and electrically conductive enough to be electrostatically painted.

The present invention additionally provides an electrically conductive sheet molding compound composition comprising a resin mixture including a thermoset resin and about 20 to about 60% by weight of styrene-butadiene rubber; a catalyst; an inhibitor; a mold release agent; fibrous reinforcing material; conductive carbon black; Group IIA metallic oxide or hydroxide; and an isocyanate terminated urethane prepolymer dual functional additive.

The present invention is also directed to a method for producing an electrically conductive sheet molding compound composition. The method includes mixing together a resin mixture including a thermoset resin and about 20 to about 60% by weight of thermoplastic resin based on the total weight of the resin mixture, the thermoplastic resin being selected from the group consisting of styrene-butadiene rubber, polystyrene, saturated polyester resin, and mixtures thereof; catalyst, inhibitor, mold release agent, and conductive carbon black to produce a sheet molding compound composition mixture. Conductive carbon black is present in a sufficient quantity to render an article molded with the composition with structural integrity and electrically conductive enough to be electrostatically painted. The present method also comprises adding to the mixture a Group IIA metallic oxide or hydroxide thickening agent, an isocyanate terminated urethane prepolymer dual functional additive, and fibrous reinforcing material.

DETAILED DESCRIPTION OF THE PREFERRED EMBODIMENT(S)

The following description of the preferred embodiments is mainly exemplary in nature and is in no way intended to limit the invention or its application or uses.

The present invention provides an electrically conductive sheet molding compound (SMC) composition that may be molded into an article that has a conductive surface. The article may then be painted electrostatically without the use of an electrically conductive primer layer, as the sprayed paint will adhere directly to the surface of the electrically conductive article.

The present invention electrically conductive sheet molding compound composition comprises a resin mixture including a thermoset resin and about 20 to about 60% by weight of thermoplastic resin based on the total weight of the resin mixture, the thermoplastic resin being selected from the group consisting of styrene-butadiene rubber, polystyrene, saturated polyester resin, and mixtures thereof; fibrous reinforcing material; and conductive carbon black. Conductive carbon black is preferably present in a sufficient quantity to render an article molded with the composition with structural integrity and electrically conductive enough to be electrostatically painted.

The molding compound composition may also include an isocyanate terminated urethane prepolymer additive, catalyst, inhibitor, mold release agent, Group IIA metallic oxide or hydroxide, inert filler, ethylenically unsaturated monomer and a free radical polymerization catalyst, and phase-stabilizing agent.

The present invention is predicated upon the discovery that the method of mixing together a thermoplastic resin in a specified amount and conductive carbon black as filler allows for the production of an improved electrically conductive molded article that may be painted electrostatically. The conductive carbon black is preferably in powder form, but is actually granular in nature, resulting in a consistent conductivity even when the filler is mixed in the resin mixture. Thus, simple addition of the conductive carbon black to sheet molding compound composition, in combination with a specific thermoplastic resin, provides an article with a homogenous black surface, indicating consistent conductivity, and subsequently, improved conductivity throughout the part. In addition, the use of the thermoplastic resin in the present invention composition results in improved paint adhesion. The conductive carbon black is preferably present in the sheet molding composition in the amount of at least about 0.3% by weight, and most preferably, about 0.3 to about 2.0% by weight, based on total weight of the molding composition.

The thermoset resin used in the sheet molding compound composition may be selected from a wide variety of such resins, preferably, but not limited to, resins such as polyesters, vinyl esters, epoxies, and mixtures thereof. The thermoset resin is most preferably an unsaturated polyester resin having a ratio of hydroxyl groups to carboxyl groups of approximately 5.7 to 0.8, an acid number of at least 14 and an average molecular-weight of approximately 800 to 5,000.

The thermoplastic resin employed in the present invention may be selected from polystyrenes, saturated polyester resins, and, most preferably, styrene-butadiene rubber. In order to achieve improved conductivity and adhesion, the thermoplastic is preferably present in the present composition in the amount of about 20 to about 60% by weight, based on the total weight of the resin mixture.

As used in the present specification, the term "thermoset resin" means a resin that permanently cures or solidifies under heat and pressure, while "thermoplastic resin" means a resin that has a linear macromolecular structure that repeatedly softens when heated and hardens when cooled.

The present invention composition may also comprise a catalyst, such as, but not limited to, tert-butyl perbenzoate in order to cure the composition. The sheet molding compound composition may also include any inhibitor commonly known in the art, such as parabenzoquinone and hydroquinone. The inhibitor is used to slow the curing process in order to avoid forming a pre-gel of the composition.

The mold release agent useful in the present invention may be any of those used in the prior art, such as zinc stearate, calcium stearate, magnesium stearate, organic phosphate esters and other organic liquid internal mold release agents. The agents may be employed at their art-disclosed level.

The fibrous reinforcing material or reinforcing fibers are usually present in an amount of about 10 to 80 weight percent for sheet molding compound compositions and is preferably glass fibers. The preferred range for this reinforcing fiber is approximately 15 to 65 weight percent for use in thermoset polyester resin applications, such as sheet molding compound.

Although not required, the present invention sheet molding compound composition may further comprise a dual thickening system comprised of an isocyanate terminated urethane prepolymer in an amount sufficient to react with at least 10 percent, but not more than 100 percent of the hydroxyl groups present, and a metallic oxide or hydroxide selected from the Group IIA of the periodic table in an amount to react with at least 20 percent, but not more than 100 percent of the carboxyl groups present.

The useful isocyanate terminated urethane prepolymers are based upon a polyether or polyester polyol, or a mixture thereof, and preferably a polyether polyol, and a di-isocyanate or polyisocyanate. The polyol used in the prepolymer is preferably a diol or triol having a molecular weight of approximately 600 to approximately 4,000, and preferably about 2,000, as exemplified by BASF's Pluracol P-2010, and a functionality of approximately 2 to approximately 6, preferably 2 to 3 and more preferably 2. The dual functional additive is formed in a one-step addition reaction between one equivalent weight of the polyol as described above and two equivalent weights of the polyisocyanate in the presence of approximately 0–1% of a conventional urethane catalyst such as stannous octoate, dibutyltin dilaurate, and the like, and the amount of such catalyst is determined according to the total weight of the urethane.

The isocyanate terminated urethane prepolymer is prepared by first reacting an organic polyisocyanate, and preferably a di-isocyanate with a polyol, using standard procedures to yield an isocyanate terminated prepolymer of controlled molecular weight and having an NCO/OH ratio of approximately 1.2/1 to approximately 5/1, and preferably NCO/OH between 1.8 to 3, and most preferably about 2.

The polyisocyanates used in the formation of the present invention include toluene di-isocyanate, such as the 80:20 or 65:35 isomer mixture of the 2,4- and 2,6 isomeric forms, ethylene di-isocyanate, propylene di-isocyanate, meta- and para-phenyl di-isocyanates, 4,4'-diphenyl methane di-isocyanate (MDI) or a mixture of MDI and its trifunctional cyclic adduct products containing carbiodiimide linkages, 1,5 naphthalene di-isocyanate, para- and meta-xylene di-isocyanates, alkylene di-isocyanates such as tetramethylene di-isocyanate and hexamethylene di-isocyanate, 2,4- and 2,6 di-isocyanate methylcyclohexane, dicyclohexylmethane di-isocyanate, and polymeric MDI containing an average of from two isocyanate groups per molecule. Other polyisocyanates which may be employed include polyisocyanate of toluene di-isocyanate, polyisocyanate prepolymers of aromatic type, toluene di-isocyanate based adducts, aromatic/aliphatic polyisocyanates and polyfunctional aliphatic isocyanate. The exact polyisocyanate employed is not critical, but di-isocyanates are preferred, and of these, 4,4' diphenyl methane di-isocyanate (MDI) or a mixture of MDI and its trifunctional cyclic adduct products containing carbodiimide linkages are preferred. It should be noted that differing results in respect to low shrinkage additives will be obtained by the use of different polyisocyanates and it is emphasized that di-isocyanates are preferred.

The polyol reactant used in the dual functional additive is selected from either a polyester polyol or polyether polyol, preferably polyether polyols and mixtures of two or more such polyether polyol compounds. The polyol reactant, or mixture thereof, used has an average equivalent weight of between 600 to 4,000 and a functionality of between 2 and 6, and preferably 2 to 3 and more preferably 2.

Among suitable polyether polyols, it is contemplated that polyoxyalkylene polyols and mixtures thereof may be used. These can be prepared according to well known methods, such as by condensing an alkylene oxide, or mixture of alkylene oxides using random or stepwise addition, with a polyhydric initiator or a mixture of polyhydric initiators.

The alkylene oxides contemplated for use in the prepolymer include ethylene oxides, propylene oxide, butylene oxides, amylene oxide, aralkylene oxides, such as trichlorobutylene oxide and such, and the most preferred alkylene oxide is propylene oxide or a mixture thereof with ethylene oxide using random or stepwise oxyalkylation.

Polyhydric initiators used in preparing the prepolymer polyether polyol reactant include (a) aliphatic diols such as ethylene glycol, 1,3-propylene glycol, 1,2-propylene glycol, butylene glycols, butane diols, pentane diols and the like, (b)

the aliphatic triols such as glycerol, trimethylolpropane, triethylolpropane, trimethylolhexane and the like, (c) the polyamines such as tetraethylene diamine and (d) the alkanolamines such as diethanolamine, triethanolamine, and the like. Preferably, the polyhydric initiators of choice for use in preparing the polyether polyol reactant is an aliphatic diol or triol such as ethylene glycol, propylene glycol, glycerol, trimethylolpropane, and the like.

If a polyester polyol is selected for use as the polyol reactant of the dual functional additive, such a polyol is usually formed by reacting a polycarboxylic acid with a polyhydric initiator, such as a diol or triol. The polycarboxylic acids include oxalic, malonic, succinic, glutaric, adipic, pimelic, suberic, azelaic acid, and the like. Illustrative polyhydric alcohols include various diols and triols and higher functionality alcohols such glycol, 1,3-propylene glycol, 1,2-propylene glycol, butylene glycols, butane diols, pentane diols, glycerol, trimethylolpropane, trimethylolhexane, hexane 1,2,6-triol and the like.

When a polyether polyol reactant is to be created by the alkylene oxide polyhydric initiator reaction, usually a catalyst, such as the art-disclosed catalyst KOH, is added to speed up the reaction. The resulting polyether polyol should have an average molecular weight of approximately 600 to 4,000. After reaction, the catalyst is preferably removed, leaving a polyether polyol suitable for reaction with the polyisocyanate reactants as discussed above to form the isocyanate terminated urethane prepolymer of the present invention.

In forming the isocyanate terminated urethane prepolymer, one equivalent weight of the polyol reactant as defined above is reacted with 1.2 to 5, and preferably two equivalent weights of a polyisocyanate as defined previously in the presence of any conventional urethane catalysts such as stannous octoate, dibutyltin dilaurate and the like, whereby the isocyanate groups are placed on the terminal ends of the prepolymer, thereby yielding the isocyanate terminated urethane prepolymer. It should be noted that the prepolymer may be made in the presence of a monomer or a monomer may be added to or dissolved in the monomer after it has been made, without adversely affecting its function as a low profile additive and as a viscosity index modifier to impart the desired advantages.

The isocyanate terminated urethane prepolymer additive may optionally be used with any of the conventional low shrink additives of the prior art, such as styrene-butadiene copolymer, polystyrene or a mixture thereof, or any other linear oligomer having a molecular weight within the range of approximately 400 to about 200,000, and preferably about 1000 to approximately 100,000.

Moreover, regardless of whether or not the prepolymer is used with a conventional low shrink additive, the ratio of the total amount of prepolymer when employed in the present invention to polyester resin should optimally be within the range of approximately 10 parts by weight of prepolymer to 100 parts by weight of polyester resin, to approximately 40 parts by weight of prepolymer to 60 parts by weight of polyester resin.

When used in a sheet molding compound composition, the isocyanate terminated urethane prepolymer may be dissolved in styrene and then used like any other low shrink additive, and is employed in an amount sufficient to react with at least 10 percent but not more than 105 percent of the hydroxyl groups present in the reaction.

The metallic oxide or hydroxide used in the dual thickening system is preferably a metal oxide or hydroxide from Group IIA on the periodic table, preferably calcium or magnesium. Although calcium may be used in its various oxides and hydroxides, magnesium is preferred in as much as superior results are achieved by the use of magnesium.

Although the prepolymer may be used alone, it may also be used with a monomer from the group styrene, vinyl toluene and vinyl acetate and any other ethylenically unsaturated monomer and when so used, is ordinarily present in an amount to give 0.5 to 3.5 moles of monomer unsaturated per mole of unsaturation in, for example, an unsaturated polyester resin. Styrene and vinyl toluene are preferred monomers, although others may be used.

A free radical polymerization catalyst may also be employed in the present invention. The catalyst is preferably present in an amount of 1.0 to 5.0 parts per 100 parts of total resin and monomer, the parts being measured by weight. The free radical polymerization catalyst is added to the uncured composition so that upon heating to the activation temperature, the additive type cross-linking polymerization reaction will commence between the polymerizable monomer and the unsaturated polyester resin to form the matrix previously described. The catalyst is usually employed in an amount in the range of about 1.0 to 3.0 parts per 100 parts of the total monomer and resin and is usually a peroxide.

A phase-stabilizing agent or additive for use in thermoset resin products may also be used in the present invention composition. The agent may comprise a fatty acid, dimer acid, or a polyester polyol. The use of such compounds, in spite of the resulting increase in the viscosity of the overall system (or in some cases the negligible effect on viscosity), results in a system which retains its phase stability even under the high temperatures and conditions encountered in molding processes and, more importantly, during the maturation process.

The fatty acids useful in the present invention are the $C_5$ to $C_{22}$ saturated and unsaturated, branched or straight chain, fatty acids. Preferred materials include lauric, palmitic, stearic, oleic, linoleic, linolenic, caproic, caprylic, capric, myristic, palmitoleic acid, cerotic, cetoleic, and mixtures thereof. Highly preferred materials include lauric, palmitic, stearic, oleic, linoleic, linolenic acids, and mixtures thereof. In a highly preferred embodiment, a mixture of stearic and oleic acids is employed. These materials are items of commerce and are generally obtained by extraction from beef tallow, coconut oil, corn oil, cottonseed oil, olive oil, palm oil, palm kern oil, and the like.

The preferred dimer and trimer acids useful in the practice of the present invention are the $C_{30}$–$C_{54}$ materials, i.e., those containing about 30 to about 54 carbon atoms. These are generally dibasic acids. They may be joined at the nonfunctional end or, in the case of a dimerization of any two unsaturated acid molecules, may be joined at the middle (unsaturated) positions. Mixture of such material may also be employed.

Particularly preferred are dimer or trimer acids prepared from the monomeric materials recited above, i.e., dimer acids prepared by the union of at least two (and in the case of trimer acids—three) acid moieties selected from lauric, palmitic, stearic, oleic, linoleic, linolenic, caproic, caprylic, capric, myristic, and palmitoleic acids. Even more preferred are the dimer acids having about 36 carbon atoms, i.e., prepared by the union of two or more $C_{18}$ fatty acids and trimer acids having about 54 carbon atoms.

The third class of phase stabilization additives or agents useful in the practice of the present invention are polyester polyols; mixtures of polyester polyols may also be employed. The preferred polyols, or mixtures of polyols, have an average molecular weight in the range of about 200 to about 6,500. More preferably, the polyol employed has an average molecular weight of about 300 to about 5,000, and still more preferably about 400 to about 4,500, and still more preferably about 600 to about 4,000. In a highly preferred embodiment, the polyol employed has an average molecular weight of about 1,000 to about 3,000. The polyols preferred for use in the practice of the present invention possess an average functionality of about 2 to about 4, and preferably about 2 to about 3.

Any number of nonreinforcing fillers, such as clay, carbon fiber, and calcium carbonate, may be added to the composition to reduce overall material costs without sacrificing a significant degree of the desirable physical properties in the final product, or may be added to impart specific properties to the uncured compound. The fillers may be used in an amount ranging from about 20 parts to 1,000 parts by weight per 100 parts of the pure polyester resin in thermoset polyester resin applications, such as a sheet molding compound compcompound The present invention sheet molding compound compositions may also contain additional additives or fillers commonly known in the art.

In general, the sheet molding compound compositions of the present invention are prepared by mixing, blending, or otherwise contacting at least two submixtures or parts together. The first submixture or part generally contains the thermoset and thermoplastic resins, inhibitor, conductive carbon black, filler, catalyst, and mold release agent. The submixture may additionally include phase-stabilizing additives or agents, an inert filler, and an ethylenically unsaturated monomer with a free radical polymerization catalyst. Alternatively, the sheet molding compound composition may include an additional submixture comprising a predispersion of conductive carbon black which is added separately from the first submixture. A second submixture or part generally contains the Group IIA metal oxide (or hydroxide). A possible third submixture or part contains the dual functional additive or prepolymer as set forth herein and described in U.S. Pat. Nos. 4,535,110 and 4,622,354, incorporated herein by reference. A fibrous reinforcing material may also be added to the composition.

In a preferred method of the present invention, the conductive carbon black is simply added as filler to the resin mixture, avoiding the need to produce a predispersion solution. In an alternate embodiment, however, the carbon black may be dispersed within the thermoset and thermoplastic resins or a predispersion of conductive carbon black may be added separately from the resin mixture to the sheet molding compound composition. In addition, conductive carbon black may be extruded with the thermoplastic resin employed in the present invention.

The present invention compositions and methods may be used to mold various articles or parts including, but not limited to, automotive parts such as hoods or doors that may require a Class A finish, fenders, and supports, i.e., a smooth pit-free finish comparable to sheet metal counterpart panels.

The invention is further described in the following examples. The examples are merely illustrative and do not in any way limit the scope of the invention as described and claimed.

EXAMPLES

| MATERIAL | COMPOSITION 1 Parts By Weight | COMPOSITION 2 Parts By Weight |
| --- | --- | --- |
| Polyester resin | 60.0 | 60.0 |
| Styrene-butadiene rubber solution (32%) | 40.0 | 30.0 |
| Tert-butyl perbenzoate | 1.0 | 1.0 |
| Zinc stearate | 3.0 | 1.0 |
| Dimer acid | — | 2.0 |
| Calcium carbonate | 100.0 | 100.0 |
| Conductive carbon black | 2.0 | 2.0 |
| Magnesium oxide | 1.0 | 0.5 |
| Urethane prepolymer | — | 10 |
| Glass fiber (1") | 140.0 | 140.0 |
| Ramsburg sprayability | 160.0 | 165.0 |

Each of the above example sheet molding compound compositions when molded into an article exhibit improved paint adhesion and consistent conductivity throughout the article. The sheet molded compound is typically molded under heat and pressure by compression molding techniques, such as those described in the following U.S. patents which are hereby incorporated by reference: U.S. Pat. Nos. 4,488,862; 4,612,149; 4,855,097; 4,551,085 and 5,130,071. Other molding techniques, however, may also be used.

What is claimed is:

1. An electrically conductive sheet molding compound composition comprising:
    (a) a resin mixture including a thermoset resin and about 20 to about 60% by weight of thermoplastic resin based on the total weight of said resin mixture, said thermoplastic resin being selected from the group consisting of styrene-butadiene rubber, polystyrene, saturated polyester resin, and mixtures thereof;
    (b) conductive material present in a sufficient quantity to render an article molded with said composition with structural integrity and electrically conductive enough to be electrostatically painted; and
    (c) fibrous reinforcing material.

2. A composition according to claim 1 wherein said thermoset resin is selected from the group consisting of unsaturated polyester resins, vinyl esters, epoxies, and mixtures thereof.

3. A composition according to claim 1 which further comprises an isocyanate terminated urethane prepolymer additive.

4. A composition according to claim 3 which further comprises a phase stabilizing agent.

5. A composition according to claim 1 wherein said conductive material is conductive carbon black present in an amount of at least about 0.3% by weight, based on total weight of said composition.

6. A composition according to claim 1 further comprising a catalyst, inhibitor, mold release agent, and Group IIA metallic oxide or hydroxide.

7. A composition according to claim 6 further comprising an inert filler, an ethylenically unsaturated monomer and a free radical polymerization catalyst.

8. An electrically conductive sheet molding compound composition comprising:
    (a) a resin mixture including a thermoset resin and about 20 to about 60% by weight of styrene-butadiene rubber;
    (b) a catalyst;
    (c) an inhibitor;
    (d) a mold release agent;
    (e) fibrous reinforcing material;
    (f) an isocyanate terminated urethane prepolymer dual functional additive;
    (g) Group IIA metallic oxide or hydroxide; and
    (h) conductive carbon black present in a sufficient quantity to render an article molded with said composition with structural integrity and electrically conductive enough to be electrostatically painted.

9. A composition according to claim 8 wherein said conductive carbon black is present in an amount of at least about 0.3% by weight, based on total weight of said composition.

10. A composition according to claim 8 further comprising an inert filler, an ethylenically unsaturated monomer and a free radical polymerization catalyst, and a phase stabilizing agent.

11. A molded article having an electrical conductivity, wherein said article is molded under heat and pressure from a sheet molding compound composition according to claim 1.

12. A method for producing an electrically conductive sheet molding compound composition comprising the steps of admixing the components defined in claim 1.

13. A method according to claim 12 wherein said conductive carbon black is added to said resin mixture as a filler.

14. A method according to claim 12 wherein said conductive carbon black is dispersed within said thermoset and thermoplastic resins.

15. A method according to claim 12 wherein a predispersion of conductive carbon black is added separately from said resin mixture to said sheet molding compound composition.

16. A method according to claim 12 wherein said conductive carbon black is extruded with said thermoplastic resin.

17. A method for producing an electrically conductive sheet molding compound composition comprising the steps of:
  (a) mixing together a resin mixture including a thermoset resin and about 20 to about 60% by weight of thermoplastic resin based on the total weight of said resin mixture, said thermoplastic resin being selected from the group consisting of styrene-butadiene rubber, polystyrene, saturated polyester resin, and mixtures thereof; a catalyst, inhibitor, mold release agent, and conductive carbon black to produce a sheet molding compound composition mixture;
  (b) adding to said mixture a Group IIA metallic oxide or hydroxide thickening agent;
  (c) combining with said mixture an isocyanate terminated urethane prepolymer dual functional additive; and
  (d) adding to said mixture fibrous reinforcing material; said carbon black being present in a sufficient quantity to render an article molded with said composition with structural integrity and electrically conductive enough to be electrostatically painted.

18. A method according to claim 17 wherein said conductive carbon black is first dispersed within said thermoset and thermoplastic resins.

19. A method according to claim 17 wherein a predispersion of conductive carbon black is added separately from said resin mixture to said sheet molding compound composition.

20. A method according to claim 17 wherein said conductive carbon black is first extruded with said thermoplastic resin.

21. A method for electrostatically painting a part comprising the steps of:
  (a) forming a sheet molding compound charge including the steps of (i) mixing together a resin mixture including a thermoset resin and about 20 to about 60% by weight of thermoplastic resin based on the total weight of said resin mixture, said thermoplastic resin being selected from the group consisting of styrene-butadiene rubber, polystyrene, saturated polyester resin, and mixtures thereof; a catalyst, inhibitor, mold release agent, and conductive carbon black to produce a sheet molding compound composition mixture; (ii) adding to said mixture a Group IIA metallic oxide or hydroxide thickening agent; (iii) combining with said mixture an isocyanate terminated urethane prepolymer dual functional additive; and (iv) adding to said mixture fibrous reinforcing material; said carbon black being present in a sufficient quantity to render an article molded with said composition with structural integrity and electrically conductive enough to be electrostatically painted;
  (b) placing said sheet molding compound charge into a mold and closing said mold;
  (c) molding said charge under heat and pressure to cure said thermoset resin, forming an article;
  (d) removing said article from said mold; and
  (e) electrostatically painting said article, wherein said article is an automotive body panel.

* * * * *